United States Patent [19]

Kokaji et al.

[11] 4,072,957

[45] Feb. 7, 1978

[54] NON-IMPACT PRINTING SYSTEM WITH MAGNETIC RECORDING APPARATUS AND METHOD

[75] Inventors: Norio Kokaji; Toshihiro Urano, both of Tokyo, Japan

[73] Assignee: Iwatsu Electric Company, Ltd., Japan

[21] Appl. No.: 651,227

[22] Filed: Jan. 22, 1976

[30] Foreign Application Priority Data

Mar. 13, 1975 Japan .................................. 50-30567

[51] Int. Cl.² ......................... G03G 19/00; G11B 5/02

[52] U.S. Cl. ....................................... 346/74.1; 360/57

[58] Field of Search ................. 346/74.1; 360/105, 57, 360/101, 100, 87

[56] References Cited

U.S. PATENT DOCUMENTS

| | | | |
|---|---|---|---|
| 1,886,616 | 11/1932 | Alverson | 360/57 |
| 3,043,685 | 7/1962 | Rosenthal | 346/74.1 |
| 3,248,719 | 4/1966 | Uemura | 346/74.1 |
| 3,699,587 | 10/1972 | Currie | 346/74.1 |
| 3,838,446 | 9/1974 | Otsuka | 360/57 |
| 3,860,958 | 1/1975 | Hanson | 360/57 |
| 3,946,404 | 3/1976 | Berkowitz et al. | 346/74.1 |

*Primary Examiner*—Jay P. Lucas
*Attorney, Agent, or Firm*—Oblon, Fisher, Spivak, McClelland & Maier

[57] ABSTRACT

A magnetic recording method and apparatus is disclosed. The magnetic recording method includes forming a magnetic latent image on a recording medium with a scanning recording head so that the magnetic latent image has substantially the same width as that of the recording head, recording the magnetic latent image again with the recording head shifted from its first position by a predetermined width to cause overlapping to form a magnetic latent image with a predetermined width narrower than the width of the recording head and making the narrowed magnetic latent image visible.

8 Claims, 8 Drawing Figures

NON-IMPACT PRINTING SYSTEM WITH MAGNETIC RECORDING APPARATUS AND METHOD

BACKGROUND OF THE INVENTION

1. Field of the Invention

This invention relates to a non-impact printing system, more particularly, to a magnetic recording method and apparatus in which letters, marks or numerals are successively magnetically recorded on a magnetic recording medium.

2. Description of the Prior Art

U.S. Pat. No. 3,254,626 discloses a high speed printing system where magnetic latent images are successively recorded on a magnetic recording medium. The recording is later developed or made visual by applying ferromagnetic powder thereto. Thereafter, a series of visible records may be reprinted.

It is desirable to realize high image density as well as high resolution. However, the width of a recording head, i.e. the width of a core, can not be technically or economically narrowed to less than 0.25 mm. Accordingly, even if the head cores are disposed in parallel as closely as possible to each other, the density obtained is still not high enough and the resolution may be unsatisfactory.

SUMMARY OF THE INVENTION

An object of the present invention is to provide a magnetic recording method and apparatus in which letters, marks or numerals successively and magnetically recorded on a recording medium can be transcribed economically on another printing paper.

Another object of the present invention is to provide a magnetic recording method and apparatus in which high resolution with sharply narrowed records can be obtained.

The foregoing and other objects are attained in accordance with one aspect of the present invention through the provision of a magnetic recording method and apparatus in which a recording head scans a recording medium to form a magnetic latent image having the width of the recording head and then scans the recording medium again with the recording head shifted from the first position by a predetermined width to cause overlapping of the magnetic latent image to obtain sharpened and narrowed records.

BRIEF DESCRIPTION OF THE DRAWINGS

Various objects, features and attendant advantages of the present invention will be more fully appreciated as the same becomes better understood from the following detailed description of the present invention when considered in connection with the accompanying drawings, in which.

DETAILED DESCRIPTION OF THE PREFERRED EMBODIMENTS

Figure 1:
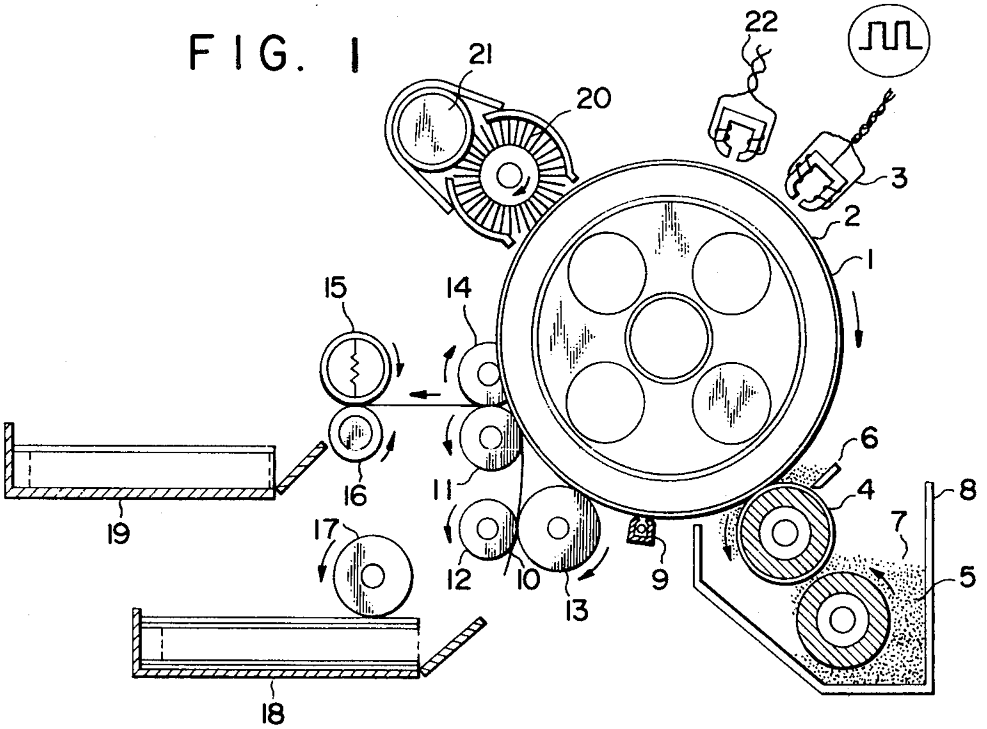
FIG. 1 is a schematic diagram which illustrates a magnetic recording apparatus according to the present invention.

Referring now to the drawings, wherein like reference numerals designate identical or corresponding parts throughout the several views, and more particularly to FIG. 1 thereof, a magnetic recording apparatus according to the present invention will be described.

a drum 1 is covered with a magnetic thin film 2 and rotates in the direction of the arrow. The magnetic thin film 2 comprises Co-Ni-P, Co-P or $\gamma$-$Fe_2O_3$ and the like which has a magnetic nature. It is preferable to cover the thin film 2 with a protective film.

A magnetic recording head 3 records a magnetic latent image on the thin film 2 corresponding to an image signal. A roller 4 for development makes the magnetic latent image visible with a magnetic toner 7. A plate 6 regulates the thickness of the magnetic toner. A roller 5 conveys the magnetic toner 7.

A container 8 accommodates the roller 4, the plate 6, the conveying roller 5 and the magnetic toner 7. A development device comprises the rollers 4 and 5, the plate 6 and the magnetic toner 7. Development is performed after forming the magnetic latent image on the drum 1. The magnetic toner adhering to the magnetic latent image through magnetic attraction is transcribed to a printing paper 10 by a transferring roller 11.

The toner transcribed to the printing paper 10 is fixed by a fixing device comprising heating rollers 15 and 16. Rollers 12, 13 and 14 are for transmitting the printing paper 10. A feeding roller 17 is for supplying the printing paper 10 from a paper feeder 18. The fed printing paper 10 is stacked in a paper receiving stand 19.

There are generally two transferring methods, a pressure transferring method and an electrostatic transferring method. In the electrostatic transferring method, it is preferable to give the toner a charge needed for transfer by means of a charging device 9 when the amount of charge of the magnetic toner causing by scraping in the development device is too small. Accordingly, the charging device 9 is provided as required.

The toner residing on the drum 1 after the toner is transcribed to the printing paper 10 is cleaned out by means of a cleaning device comprising a cleaning brush 20 and an exhausting duct 21. Thereafter, the magnetic latent image on the drum 1 is erased by an erasing head 22. The above-mentioned process constitutes one cycle for recording letters, marks or numerals and the like on printing paper.

Instead of heat fixing, the fixing operation may be performed either by a pressure or by chemical means. The erasing operation may be performed using either D.C. or A.C. The erasing head or heads 22 may be omitted depending upon the recording method, for example, in case of utilization of the NRZ method, the erasing head may be omitted. If multiple copies are to be made, the recording head 3 and the erasing head 22 are not energized.

Recording a magnetic latent image on the drum 1 may be performed by using single recording or erasing head or a plurality of recording or erasing heads. The heads can be movable with a stationary drum or the heads can be stationary with a rotatable drum. The recording or erasing heads may be either in contact with the drum 1 or in non-contact with the drum 1.

The magnetic toner comprises a ferromagnetic powder of iron, iron oxide or ferrite and a resin for fixing may comprise one particle. Alternatively, the magnetic toner may comprise an iron powder and a toner, i.e. two particles. The system is applicable to a printer, a facsimilie receiving device and the like.

Figure 2:
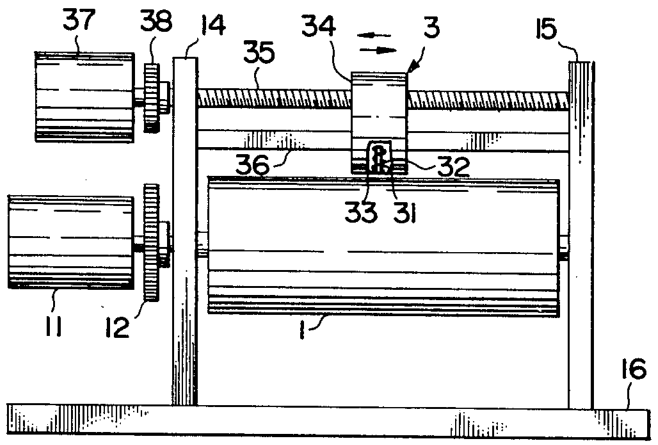
FIG. 2 is a view in side elevation which illustrates the recording portion of a magnetic recording apparatus of the present invention, FIGS. 3(*a*)–(*e*) illustrate the manner in which letters, marks or numerals are magnetically recorded on a recording medium using a recording head.

FIG. 2 is a side elevation view of the magnetic recording device shown in FIG. 1. Referring to FIG. 2, a magnetic recording head 3 comprises a core 31, a coil 32, a core holder 33 and a head holder 34. The recording head 3 moves in the axial direction as shown by arrows by means of a feeding screw 35 and a guide bar 36. A pulse motor 37 rotates the feeding screw 35. A gear 38 is for decreasing the speed. A main motor 11 is for rotating the drum 1. Side plates 14 and 15 and a bottom plate 16 support the drum 1, the guide bar 36 and the feeding screw 35.

Figure 3:
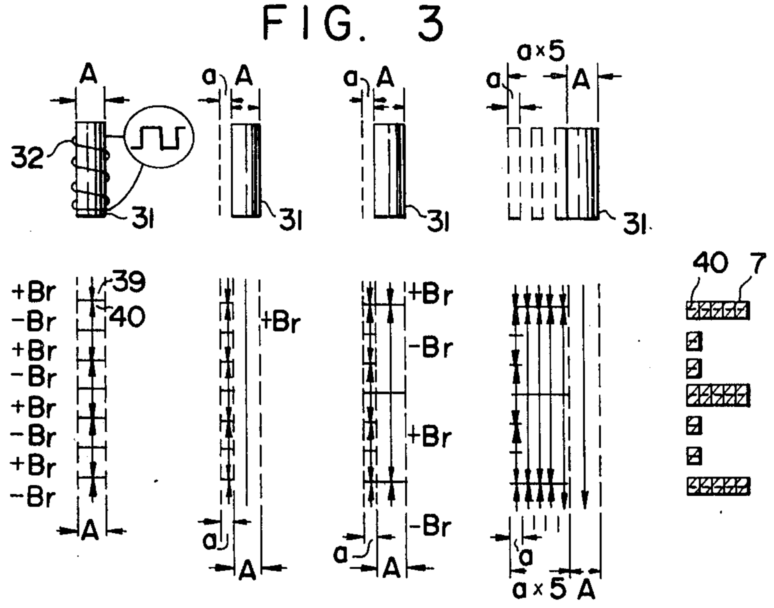

FIG. 3 is an embodiment of the present invention illustrating the method for recording the magnetic latent image on the drum 1. The embodiment of the recording method according to the present invention will be explained with respect to the NRZ method.

Figure 4:
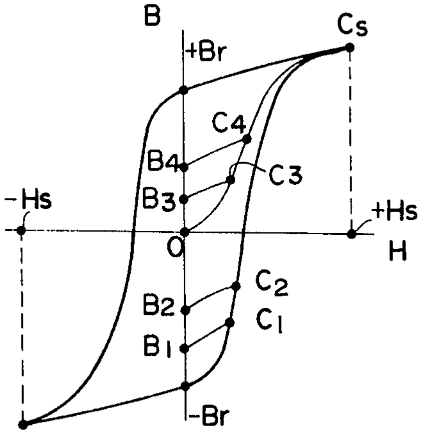
FIG. 4 is a view which shows a B-H characteristic curve used to explain embodiments of the present invention shown in FIG. 3, FIG. 5 and FIG. 6, FIG. 5 and FIG. 6 illustrate other ways in which letters, marks or numerals are magnetically recorded according to other embodiments of the present invention.

Referring to FIG. 3 and assuming that a pattern as shown in FIG. 3(*a*) is recorded on the drum 1 by way of current in the magnetic core 31, this embodiment of the present invention will now be described. 39 indicates a direction of magnetization. +B*r*, −B*r* indicates strength of residual magnetization when a magnetic field +H*s*, −H*s* on a B-H curve as shown in FIG. 4 is applied to the magnetic thin film 2 of the drum 1. 40 indicates a part in which the magnetization is reversed. The magnetic reverse part 40 magnetically attracts the magnetic toner 7. Assuming that the width of the magnetic core 31 is A, the width of the magnetization pattern is also A.

As shown in FIG. 3(*b*), when the magnetic core 31 is shifted in the direction of the width by *a*, the width *a* part of the magnetic pattern or magnetic latent image remains because a magnetic field H*s* is not applied to the width *a* portion of the magnetic latent image. At this time, a portion of the magnetic latent image where the magnetic field +H*s* is applied has a strength +B*r* of residual magnetization as shown in FIG. 4 by the width A. As a reslt thereof, the width (A minus *a*) portion of the magnetic latent image is erased. Instead of (*b*) of FIG. 3 as shown in (*c*) of FIG. 3, when the magnetic field +H*s* → −H*s* → +H*s* → −H*s* is applied to the drum 1, the residual magnetic pattern corresponding +B*r* → −B*r* → +B*r* → −B*r* is formed. The width (A minus *a*) part of the magnetic latent image as shown in (*a*) of FIG. 3 is erased. At the same time, a new magnetic pattern or a new magnetic latent image with the width A is recorded on the drum 1 as shown in (*b*) and (*c*) of FIG. 3.

When a scanning operation as shown in (*c*) of FIG. 3 is repeated, the record as shown in (*d*) of FIG. 3 is obtained. For example, an E character pattern is recorded on the thin magnetic film 2 by controlling the current to the magnetic core 31 when the magnetic core 3 is shifted by the width *a* at each scanning time. In this case, the magnetic core 31 is scanned five times so as to form the character E as shown in (*e*) of FIG. 3 which is made visible because the magnetic reverse part 40 attracts the magnetic toner 7.

In this embodiment, erasing and recording operations are performed at the same time so that the erasing head 22 may be omitted. However, according to the above mentioned recording method, the last magnetic latent image, that is to say, the fifth overlapping record, has a width A and so the magnetic core 31 is shifted by the width *a*. The magnetic core 31 with an erasing current scans again so that a magnetic latent image of width *a* in the last line can be obtained. According to the embodiment, the width A of the magnetic core is 0.5 mm and the width *a* is from 0.05 mm to 0.5 mm.

Figure 5:
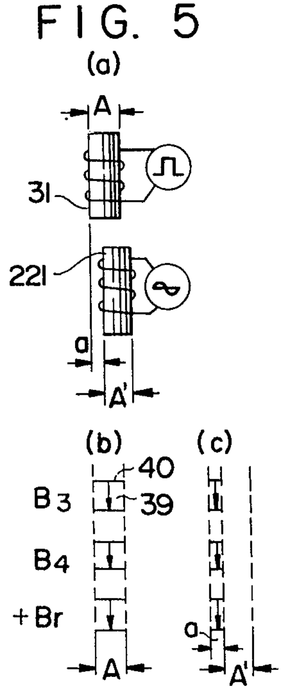

Another embodiment will now be explained with reference to FIG. 5. An erasing head core 221 is provided at the position shifted by the width *a* from the recording head 31 as shown in FIG. 5(*a*). In the case of a RZ recording method employing A.C. erasing a magnetic latent image recorded by the recording head core 31 is shown in FIG. 5(*b*). Then, when the magnetic latent image is scanned by the erasing head core 221 again, the width *a* part of the magnetic latent image remains as shown in FIG. 5(*c*) because the rest of the magnetic latent image is erased by the erasing head core 22. Referring to FIG. 4, when the following magnetizing process *o* →C3 →B3(→0), 0 →C4 →B4(→0) and 0 →C5 →B5(→0) is successively performed, the magnetic latent image as shown in FIG. 5(*b*) can be obtained, where (→0) means erasure. As a result thereof, the middle value of different magnetic intensities, for example, magnetic strengths B3 and B4 as shown in FIG. 4, is obtained. It is not necessary that the width A of the erasing head be the same as the width A of the recording head.

Figure 6:
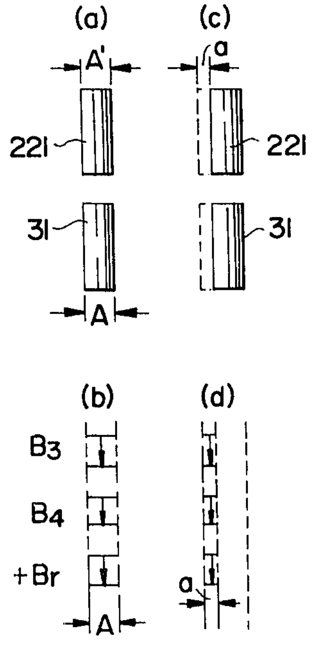

Still another embodiment of the present invention will be explained referring to FIG. 6. A position relation between a recording head 31 and a erasing head 221 is shown in FIG. 6(*a*). A magnetic pattern or a magnetic latent image recorded by the recording head 31 is shown in FIG. 6(*b*). The erasing head shifts by the width *a* till the magnetic pattern as shown in FIG. 6(*b*) comes upon the erasing head again after one rotation of the drum 1 is performed.

At this stage, when the erasing operation is performed by the shifted erasing head 221, the magnetic pattern with the width *a* as shown in FIG. 6(*d*) remains and the remaining part of the magnetic pattern is erased. Then the recording head 31 is adjusted to zero magnetic strength as shown in FIG. 4. Thereafter, the recording is effected from the magnetic strength zero by means of the recording head 31. The recording method according to the embodiment of FIG. 6 is the same as that of the embodiment of FIG. 5.

On the other hand in the case of the recording method employing D.C. erasing, when a magnetic field −H*s* is applied to the drum 1 by the recording head 31, the magnetic strength becomes −B*r*. The residual magnetization of the drum 1 is transformed from magnetic strength B1 to magnetic strength +B*r* after the drum 1 is magnetized from C1 to C*s* as shown in FIG. 4. When one rotation of the drum 1 is effected, the recording head 3 is shifted by the width *a* by means of rotation of a feeding screw 35. The shifting method may be performed by the pulse motor or performed continuously through a main motor and gear.

Where the pulse motor is employed, a shifted width of the recording head is easily changed. The line density of the magnetic latent image may be changed by controlling the width *a* to be shifted or by controlling number of steps of the pulse motor. For example, assuming that 0.1 mm per step is predetermined, the line density of $0.1 \times n$ is obtained where *n* is the step number applied to the pulse motor during one rotation of the drum 1 and is an integral number.

Figure 7:
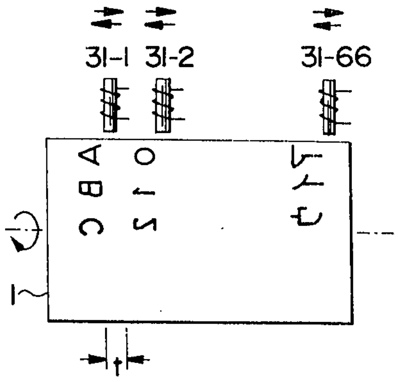
FIG. 7 is a view which shows another embodiment of the present invention wherein records are magnetically formed on the recording medium using a plurality of parallelly disposed recording heads, FIGS. 8(*a*) and 8(*b*) are side and front elevation views which show another embodiment of the present invention.

Referring to FIG. 7, another embodiment of the present invention will be explained wherein a plurality of magnetic cores are provided and are scanned at the same time. As shown in FIG. 7, 66 magnetic cores are provided in order to print 66 lines per page. In this case, the width of the erasing head is more than *t*. There is a possibility of erasing the starting part of the next line because a right end of one core 31-1 for a first line crosses the starting part of the next line. In a general line printer, the space *t* between characters of each line is 1.6 mm so that the core is wide enough to permit practical use.

Figure 8:
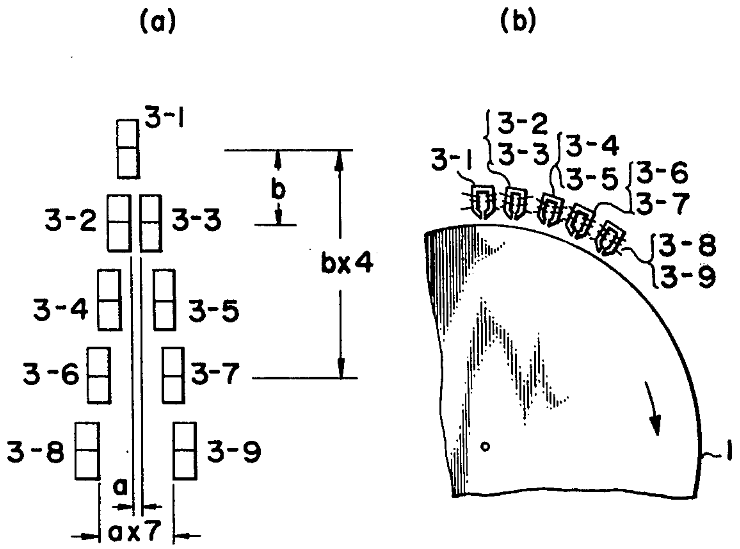

Still another embodiment of the invention will be explained referring to FIG. 8. FIGS. 8(*a*) and 8(*b*) show an arrangement of head cores along the front of the drum 1 and an arrangement of head cores along the side of the drum 1 respectively. 3-1 to 3-7 are recording head cores which are position shifted by the width *a* with respect to each other. The recording heads 3-1 to 3-7 are used to form one character. The head cores 3-1 to 3-7 perform both the operations of recording and erasing. Erasing heads 3-8 and 3-9 erase a portion of magnetic patterns recorded by the head cores 3-6 and 3-7 respectively so that magnetic patterns with the width *a* respectively remain.

As a result thereof, all magnetic patterns recorded by the head cores 3-1 to 3-7 have a predetermined width *a*. The space between head cores may be compensated by a delay circuit such as disclosed in applicant's Japanese patent 50-23767 so that the magnetic record pattern on the drum 1 is formed in a line. In this case, the erasing heads 3-8 and 3-9 may constitute magnetic heads in which erasing currents flow. The above-mentioned Japanese patent discloses a method for recording characters, letter and marks on the drum using multiple heads.

In the case of all embodiments of the present invention, as above-mentioned, a development is performed so as to make visible the magnetic latent image during one rotation of the drum 1 at low speed after all magnetic latent images are recorded on all surfaces of the drum 1 and after recording takes place after the core head is shifted in the direction of the axis of the drum. As above-mentioned in detail, through the preferred embodiments of the present invention, the objects of the present invention are fully realized.

Obviously, numerous modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. A method for magnetic recording comprising:

recording a first magnetic latent image of a predetermined width on the surface of a recording medium with a recording head having the predetermined width at a first position, recording a second magnetic latent image on the surface of the recording medium to overlap only a portion of the first magnetic latent image on the surface of the recording medium with a recording head at a second position displaced from the first position to form a continuous narrowed first magnetic latent image on the surface of the recording medium having a width less than the predetermined width, rendering visible the portion of the first magnetic latent image not overlapped by the second magnetic latent image.

2. A method for magnetic recording in accordance with claim 1 wherein the recording medium is a rotary magnetic drum and the second position is displaced from the first position along a line parallel to the axis of the drum.

3. A method for magnetic recording comprising:

recording a magnetic latent image of a predetermined width on the surface of a recording medium with a recording head having the predetermined width at a first position, erasing only a portion of the magnetic latent image on the surface of the recording medium with an erasing head at a second position displaced from the first position to form a narrowed magnetic latent image having a width less than the predetermined width, rendering visible the unerased portion of the magnetic latent image.

4. A method for magnetic recording in accordance with claim 3 wherein the recording medium is a rotary magnetic drum and the second position is displaced from the first position along a line parallel to the axis of the drum.

5. Magnetic recording apparatus comprising:

means at a first position for recording a first magnetic latent image of a predetermined width on the surface of a recording medium, means at a second position displaced from the first position for recording a second magnetic latent image on the surface of the recording medium to overlap only a portion of the first magnetic latent image on the surface of the recording medium to form a continuous narrowed first magnetic latent image on the surface of the recording medium having a width less than the predetermined width, means for rendering visible the portion of the first magnetic latent image not overlapped by the second magnetic latent image.

6. Magnetic recording apparatus in accordance with claim 5 wherein the recording medium is a rotary magnetic drum and the second position is displaced from the first position along a line parallel to the axis of the drum.

7. Magnetic recording apparatus comprising:

means at a first position for recording a magnetic latent image of a predetermined width on the surface of a recording medium, means at a second position displaced from the first position for erasing only a portion of the magnetic latent image on the surface of the recording medium to form a narrowed magnetic latent image having a width less than the predetermined width, means for rendering visible the unerased portion of the magnetic latent image.

8. Magnetic recording apparatus in accordance with claim 7 wherein the recording medium is a rotary magnetic drum and the second position is displaced from the first position along a line parallel to the axis of the drum.

* * * * *